(12) United States Patent
Larson et al.

(10) Patent No.: US 7,307,236 B2
(45) Date of Patent: Dec. 11, 2007

(54) CHARGE AND WELD GATING SYSTEM WITH SAFETY CIRCUIT

(75) Inventors: Travis Gene Larson, Delavan, WI (US); Blake C. Hobson, Crystal Lake, IL (US)

(73) Assignee: Image Industries, Inc., Huntley, IL (US)

( * ) Notice: Subject to any disclaimer, the term of this patent is extended or adjusted under 35 U.S.C. 154(b) by 139 days.

(21) Appl. No.: 11/292,862

(22) Filed: Dec. 2, 2005

(65) Prior Publication Data

US 2007/0125752 A1    Jun. 7, 2007

(51) Int. Cl.
*B23K 11/24* (2006.01)

(52) U.S. Cl. ..................................... 219/113

(58) Field of Classification Search .................. 219/113
See application file for complete search history.

(56) References Cited

U.S. PATENT DOCUMENTS

| | | | |
|---|---|---|---|
| 3,609,281 A | 9/1971 | Kauffman et al. | |
| 5,424,588 A | 6/1995 | Cantor et al. | |
| 6,177,645 B1 | 1/2001 | Church et al. | |
| 6,455,802 B2 * | 9/2002 | Watanabe | 219/113 |
| 2004/0145853 A1 | 7/2004 | Sekoguchi et al. | |

FOREIGN PATENT DOCUMENTS

EP     0913224 A2 *    5/1999

OTHER PUBLICATIONS

PCT International Search Report.

* cited by examiner

*Primary Examiner*—Clifford C. Shaw
(74) *Attorney, Agent, or Firm*—Leydig, Voit & Mayer, Ltd.

(57) ABSTRACT

A weld circuit for use in a welder is provided. The weld circuit comprises a charge section, a capacitor section, and a weld section. The charge section includes a first plurality of solid state switches, e.g., silicon controlled rectifiers (charge SCRs), the capacitor section includes a weld capacitor, and the weld section includes a second plurality of solid state switches, e.g., silicon controlled rectifiers (weld SCRs). The charge SCRs form a bridge between the lines in the charge circuit. One weld SCR is coupled to a first weld terminal and the other weld SCR is coupled to a second weld terminal. The charge and weld SCRs isolate the charge section, the capacitor section, and the weld section from each other. The weld circuit is coupleable to a safety circuit that comprises a resistor, a microcontroller, and optical isolators. When the optical isolators are enabled, the microcontroller monitors a current flowing through the resistor.

20 Claims, 4 Drawing Sheets

CHARGE AND WELD GATING SYSTEM WITH SAFETY CIRCUIT

FIELD OF THE INVENTION

This invention generally relates to a capacitive discharge welder and, in particular, a gating circuit for the capacitive discharge welder.

BACKGROUND OF THE INVENTION

A typical welder, such as a capacitive discharge welder, includes a transformer. This transformer is employed by the welder to step voltages up and down and to provide electrical isolation within the welder. Unfortunately, these transformers are expensive, heavy, and take up a large amount of space within the welder relative to other components.

Thus, an apparatus and system that would electrically isolate various sections of a welder from each other, without using a transformer, would be desirable. Likewise, an apparatus and system that are cost efficient, relatively light weight, and relatively small compared to a conventional transformer would also be desirable. The invention provides such an apparatus and system. These and other advantages of the invention, as well as additional inventive features, will be apparent from the description of the invention provided herein.

BRIEF SUMMARY OF THE INVENTION

In one aspect, the invention provides a weld circuit for use in a welder. The weld circuit comprises a charge section, a capacitor section, and a weld section. The charge section includes a first plurality of silicon or other solid state switches. In an embodiment of the invention, the switches comprise silicon controlled rectifiers (SCRs). Other switch types include, without limitation, IGBTs, FET, Bipolar Transistors, and so on, as will be appreciated by those of skill in the art upon reading this disclosure. The charge section has a charge section input and a charge section output. The charge section input is coupleable to a source. The capacitor section includes a weld capacitor. The capacitor section has a capacitor section input and a capacitor section output. The capacitor section input is coupleable to the charge section output. The weld section includes a second plurality of silicon or other solid state switches, which, in an embodiment of the invention, comprise SCRs. The weld section has a weld section input and a weld section output. The weld section input is coupleable to the capacitor section output and the weld section output is coupleable to weld terminals.

In another aspect, the invention provides a weld circuit for use in a welder. The weld circuit comprises first, second and third line sets, each set comprising first and second lines, a charge section, a capacitor section, a weld section, and a set of weld terminals.

The charge section includes first, second, third, and fourth charge switches, e.g., charge SCRs. The charge switches act to selectively pass and rectify current from a power source. The charge section has a charge section input and a charge section output. The charge section input is coupleable to the power source, while the charge section output is coupleable to the capacitor section. The capacitor section includes a weld capacitor and has a capacitor section input and a capacitor section output. The weld section includes first and second weld switches, e.g., weld SCRs. The first weld switch is in series with one line of the weld section, and the second weld switch is in series with the second line. The weld section has a weld section input and a weld section output. The weld section input is coupleable to the capacitor section output. A first weld terminal is connected to one line of the weld section output, and a second weld terminal is connected to the other line of the weld section output.

In yet another aspect, the invention provides a weld system for a welder. The weld system comprises a weld circuit including a charge section, a capacitor section, a weld section, and a safety circuit. The charge section includes a first plurality of solid state switches, e.g., SCRs. As described above, the charge section has a charge section input and a charge section output, the charge section input being coupleable to a power source. The capacitor section includes a weld capacitor, and has a capacitor section input and a capacitor section output. The capacitor section input is coupleable to the charge section output, while the capacitor section output is coupleable to a weld section. The weld section includes a second plurality of solid state switches. The weld section has a weld section input and a weld section output, with the weld section input being coupleable to the capacitor section output and the weld section output being coupleable to weld terminals.

The safety circuit in this embodiment of the invention includes a resistive element, a first optical isolator, a second optical isolator, and a microcontroller. The resistive element is coupleable to a direct current source at a first node. The first optical isolator has a first isolator input and a first isolator output. The first isolator input is coupleable to the resistive element at a second node. The first isolator output is coupleable to a power input of a solid state switch to be tested. The second optical isolator has a second isolator input and a second isolator output. The second isolator input is coupleable to a power output of the solid state switch to be tested. The second isolator output is coupleable to a ground reference, for example. The microcontroller is coupleable to the resistive element and monitors, via a voltage drop, a current through the resistive element when the first optical isolator and the second isolator are enabled.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
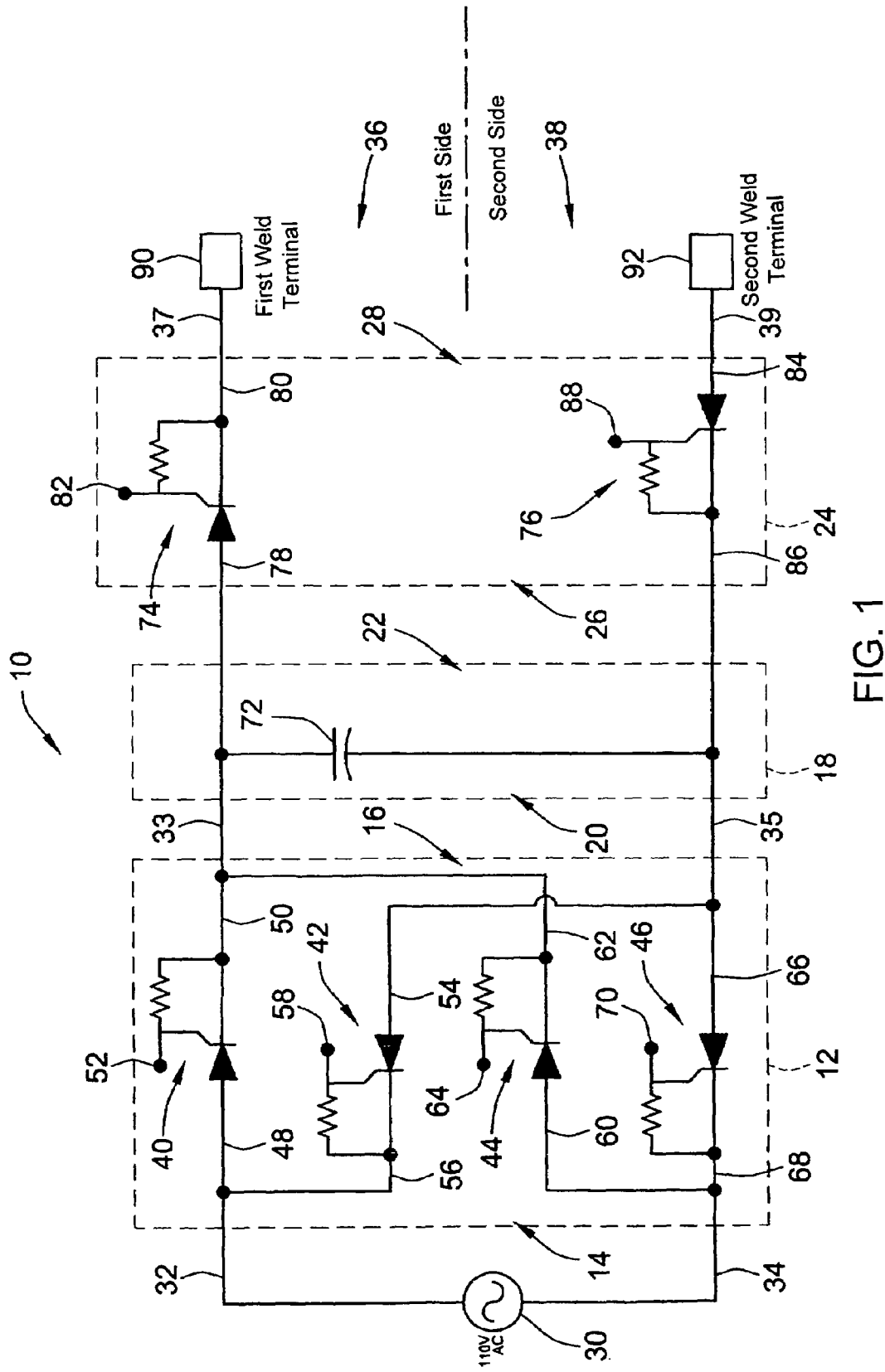
FIG. 1 is a schematic of an exemplary embodiment of a weld circuit constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention provides a weld circuit 10. Advantageously, the weld circuit 10 functions to isolate particular sections of the weld circuit from other sections. The weld circuit also operates to isolate a user of the welder from the weld capacitors and a current source such as an alternating current (AC) source or other source. Therefore, the welder is as safe or safer to use than welders that are presently commercially available.

Referring to FIG. 1, the weld circuit 10 comprises a charge section 12 having a charge section input 14 and a charge section output 16, a capacitor section 18 having a capacitor section input 20 and a capacitor section output 22, and a weld section 24 having a weld section input 26 and a weld section output 28.

The charge section input 14 is coupleable to a source 30 such as, for example, a 110 volt alternating-current (110 VAC) source. The source 30 is coupled to the charge section input 14 through what will be referred to as a first line 32 and a second line 34, and the weld circuit 10 of FIG. 1 generally has a first side 36 and a second side 38.

The charge section 12 includes a first charge solid state switch 40, a second charge solid state switch 42, a third charge solid state switch 44, and a fourth charge solid state switch 46. As noted above, in an embodiment of the invention, one or more of the solid state switches are silicon controlled rectifiers ("SCRs").

Still referring to FIG. 1, the first charge solid state switch 40 includes a first charge solid state switch anode 48, a first charge solid state switch cathode 50, and a first charge solid state switch gate 52. Likewise, the second charge solid state switch 42 includes a second charge solid state switch anode 54, a second charge solid state switch cathode 56, and a second charge solid state switch gate 58. Continuing, the third charge solid state switch 44 includes a third charge solid state switch anode 60, a third charge solid state switch cathode 62, and a third charge solid state switch gate 64. Finally, the fourth charge solid state switch 46 includes a fourth charge solid state switch anode 66, a fourth charge solid state switch cathode 68, and a fourth charge solid state switch gate 70.

In a preferred embodiment, the first charge solid state switch anode 48 is coupled to the second charge solid state switch cathode 56, the third charge solid state switch anode 60 is coupled to the fourth charge solid state switch cathode 68, the first charge solid state switch cathode 52 is coupled to the third charge solid state switch cathode 62, and the second charge solid state switch anode 54 is coupled to the fourth charge solid state switch anode 66.

In an exemplary embodiment, as illustrated in FIG. 1, the first charge solid state switch anode 48, the first charge solid state switch cathode 50, the second charge solid state switch cathode 56, and the third charge solid state switch cathode 62 are coupled to the positive line 32. Further, the third charge solid state switch anode 60, the fourth charge solid state switch cathode 68, the fourth charge solid state switch anode 66, and the second charge solid state switch anode 54 are coupled to the negative line 34. As such, the four charge solid state switches 40, 42, 44, 46 form a fully controlled bridge permitting the source 30 to be completely disconnected from the charge section 18. Thus, the source 30 and the charge section 18 are isolated from one another.

Still referring to FIG. 1, in a preferred embodiment, the first charge solid state switch anode 48, the second charge solid state switch cathode 56, the third charge solid state switch anode 60, and the fourth charge solid state switch cathode 68 are coupled to the positive and negative lines 32, 34, respectfully, proximate the charge section input 14 while the first charge solid state switch cathode 50, the second charge solid state switch anode 54, the third charge solid state switch cathode 62, and the fourth charge solid state switch anode 66 are coupled to the positive and negative lines 32, 34, respectfully, proximate the charge section output 16.

The capacitor section input 20 is coupled, preferably via a second positive line 33 and a second negative line 35 as shown in FIG. 1, to the charge section output 16. Likewise, the capacitor section output 22 is coupled, preferably through the second positive line 33 and the second negative line 35, to the weld section input 26. The capacitor section 18 includes a capacitor 72 that is often referred to as a weld capacitor, charge capacitor, or similar. As will be readily appreciated by those of skill in the art, the capacitor 72 essentially selectively absorbs, stores, and then discharges electrical energy. In a preferred embodiment, the capacitor 72 is a sixty-six thousand microfarad (66,000 µF) capacitor. As will be recognized by those skilled in the art, the capacitor 72 can, if desired, comprise a single capacitor, a bank of capacitors, etc. Moreover, the value of 66,000 µF, while suitable for many permutations and embodiments, is not critical, and much greater or much smaller capacitances may be used depending upon design preferences and other factors.

The weld section 24 includes a first weld solid state switch 74 and a second weld solid state switch 76. The first weld solid state switch 74 includes a first weld solid state switch anode 78, a first weld solid state switch cathode 80, and a first weld solid state switch gate 82. Likewise, the second weld solid state switch 76 includes a second weld solid state switch anode 84, a second weld solid state switch cathode 86, and a second weld solid state switch gate 88. In one embodiment, the first weld solid state switch 74 is disposed on the second positive line 33 and the second weld solid state switch 76 is disposed on the second negative line 35. In a preferred embodiment, the first weld solid state switch anode 78 and the first weld solid state switch cathode 80 are coupled to the second positive line 33 and the second weld solid state switch cathode 86 and the second weld solid state switch anode 84 are coupled to the second negative line 35. In an exemplary embodiment, the first weld solid state switch anode 78 and the second weld SCR cathode 86 are disposed proximate the weld section input 26 while the first weld solid state switch cathode 80 and the second weld SCR anode 84 are disposed proximate the weld section output 28. Notably, the first weld solid state switch 74 and the second weld solid state switch 76 are not coupled directly to each other but are disposed on separate lines 33, 35 of the system.

Still referring to FIG. 1, a first weld terminal 90 and a second weld terminal 92 are generally coupled to the weld section 24 proximate weld section output 28. Preferably, the first weld terminal 90 is coupled to a first weld solid state switch cathode 80 and the second weld terminal 92 is coupled to a second weld solid state switch anode 84. The first and second weld terminals 90, 92 are coupleable to a welding tool or other such device, as known in the art, to perform a welding task.

Advantageously, by employing four charge solid state switches 40, 42, 44, 46 in the charge section 12, the source 30 can be completely disconnected from the weld capacitor 72. Likewise, by employing a first weld solid state switch 74 on the first line 33 and a second weld solid state switch 76 on the second line 35, the first weld terminal 90 and the second weld terminal 92, respectively, can also be completely disconnected from the weld capacitor 72. By disposing solid state switches (e.g., 40, 42, 44, 46, 74, 76) as described, the weld circuit 10 substantially electrically isolates the different circuit sections 12, 18, 24 from each other. The solid state switches further isolate the source 30, the weld capacitor 72, and the first and second weld terminals 90, 92 from each other.

In operation, the charge and weld solid state switches generally function as simple switches as discussed above and as particularly detailed here. For instance, when the weld capacitor 72 is charging, both of the weld solid state switches 74, 76, are disabled by restricting a positive current flow, or providing a negative current flow, to the first and second weld solid state switch gates 82, 88 in the case of SCRs or similar. Other types of solid state switches may use different control mechanisms as will be appreciated by those of skill in the art. When these weld solid state switches 74, 76 are disabled, a user of the welder is isolated from the weld capacitor 72 and the source 30 as the welder charges. When charging is complete, the four charge solid state switches 40, 42, 44, 46 are disabled by similarly restricting a positive current or providing a negative current to each of the first, second, third, and fourth charge solid state switch gates 52, 58, 64, 70.

During a welding operation, both the weld solid state switches 74, 76 are enabled by providing a positive current to the first and second weld solid state switch gates 82, 88. With the weld solid state switches enabled, the charge held by the capacitor 72 will flow through the weld terminals 90, 92 and a welding task can be performed. Notably, during welding the charge solid state switches 40, 42, 44, 46 remain disabled and, therefore, the user continues to be isolated from the source 30.

Figure 2:
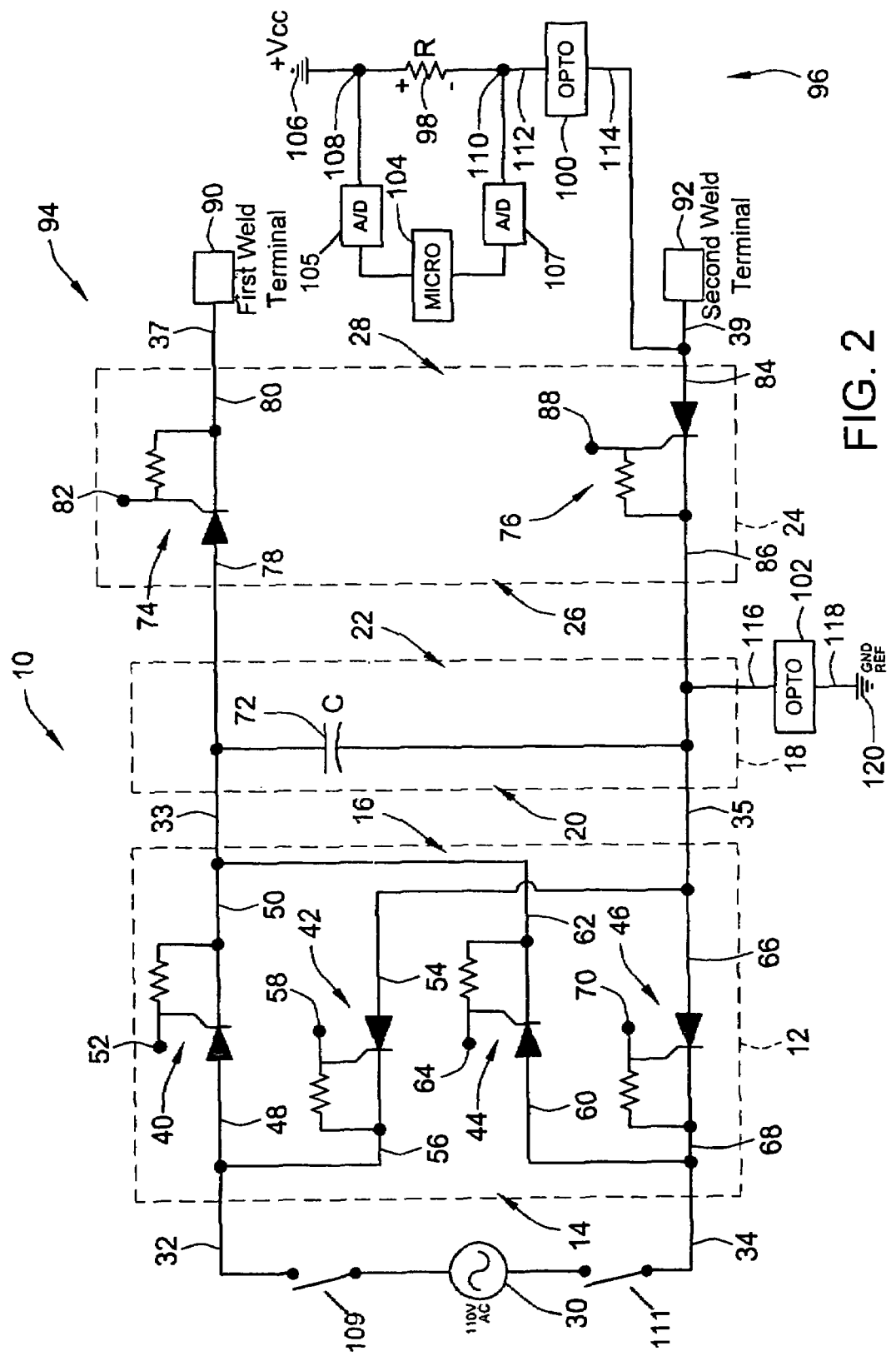
FIG. 2 is a schematic of a weld system including the weld circuit of FIG. 1 and a safety circuit.

Referring to FIG. 2, a weld system 94 is illustrated. The weld system 94 comprises the weld circuit 10 and one or more safety circuits 96. The one or more safety circuits act to check the operation of one or more elements of the weld system. The safety circuit 96 includes a resistive element such as, for example, a resistor 98, and a logic device such as a microcontroller 104 (or a microprocessor, a processor, a computer, and the like). The resistor 98 is coupleable to a direct current source 106 at a first node 108. In a preferred embodiment, the resistor 98 is an eight hundred and twenty ohm (820 Ω) resistor, although any suitable resistance may be used. The microcontroller 104, which may be shared among a plurality of similar safety circuits, senses the voltage differential across resistor 98 (i.e., between nodes 108 and 10) via A/D converters 105 and 107.

A first optical isolator 100 and a second optical isolator 102 are located on opposite sides of the device under test, such as weld SCR 76. The safety circuit 96 connects, via a second node 110, to the first optical isolator 100 (in the normal direction of flow of current when the device under test is enabled). The second isolator 102 is couples the opposite side of the device under test to a ground reference 120. In an embodiment of the invention, numerous such isolator pairs are located throughout the circuit across devices to be tested so that the safety circuit can connect to the first isolator in any such pair and test the appropriate device. For example, isolator pairs could be connected across any or all of SCRs 40, 46 and 74 as well.

In operation, using the above example, the first optical isolator 100 and the second optical isolator 102 are each enabled to execute a safety testing operation. When enabled, the first optical isolator 100 effectively connects the second weld solid state switch 76 to the direct current voltage source 106 and the second optical isolator 102 effectively connects the second weld solid state switch 76 to the ground reference 120. In other words, each of the optical isolators 100, 102, is enabled to complete a circuit through a device under test, for example, the second weld solid state switch 76.

If the device under test is disabled yet in working order (i.e., "good"), little or no current (i.e., a leakage current or less) will flow through the resistor 98 in the case where the solid state switches are SCRs or similar devices. If, however, in this example the second weld solid state switch 76 is experiencing a short or is similarly not in working order (i.e., "bad"), a substantial current will flow through the second weld solid state switch 76 and, resultantly, the resistor 98. Therefore, the microcontroller 104 will discover (using Ohm's law, the known voltage of the DC source 106, and the known resistance of resistor 98) that a large current is flowing through the resistor 98 and the "bad" second weld solid state switch 76. If, as in this example, the second weld solid state switch 76 fails as a result of a short circuit condition, the microcontroller 104 can be programmed to shut down the entire weld circuit 10 and/or weld system 94 by opening breakers 109 and 11, such as via a trip coil or other suitable device.

If the second weld solid state switch 76 should fail in an open circuit condition, the safety circuit 96 as described in this particular embodiment of the invention would not detect that problem. However, since an open circuit condition does not present a hazard to a user of the welder, the open condition is far less dangerous. Nonetheless, the open condition will cause the weld circuit 10 (and possibly the welder) to fail to properly operate. In that case, the failed operation would be detected by the microcontroller 104 and appropriate action can be taken to alert the user of the welder to the malfunction.

As can be appreciated by those skilled in the art, one or more of the safety circuits 96 can be coupled to the weld circuit 10 to correspondingly monitor the current passing through one or more of the solid state switches (e.g. 40, 42, 44, 46, 74) as well as other devices in the weld circuit 10.

Figure 4:
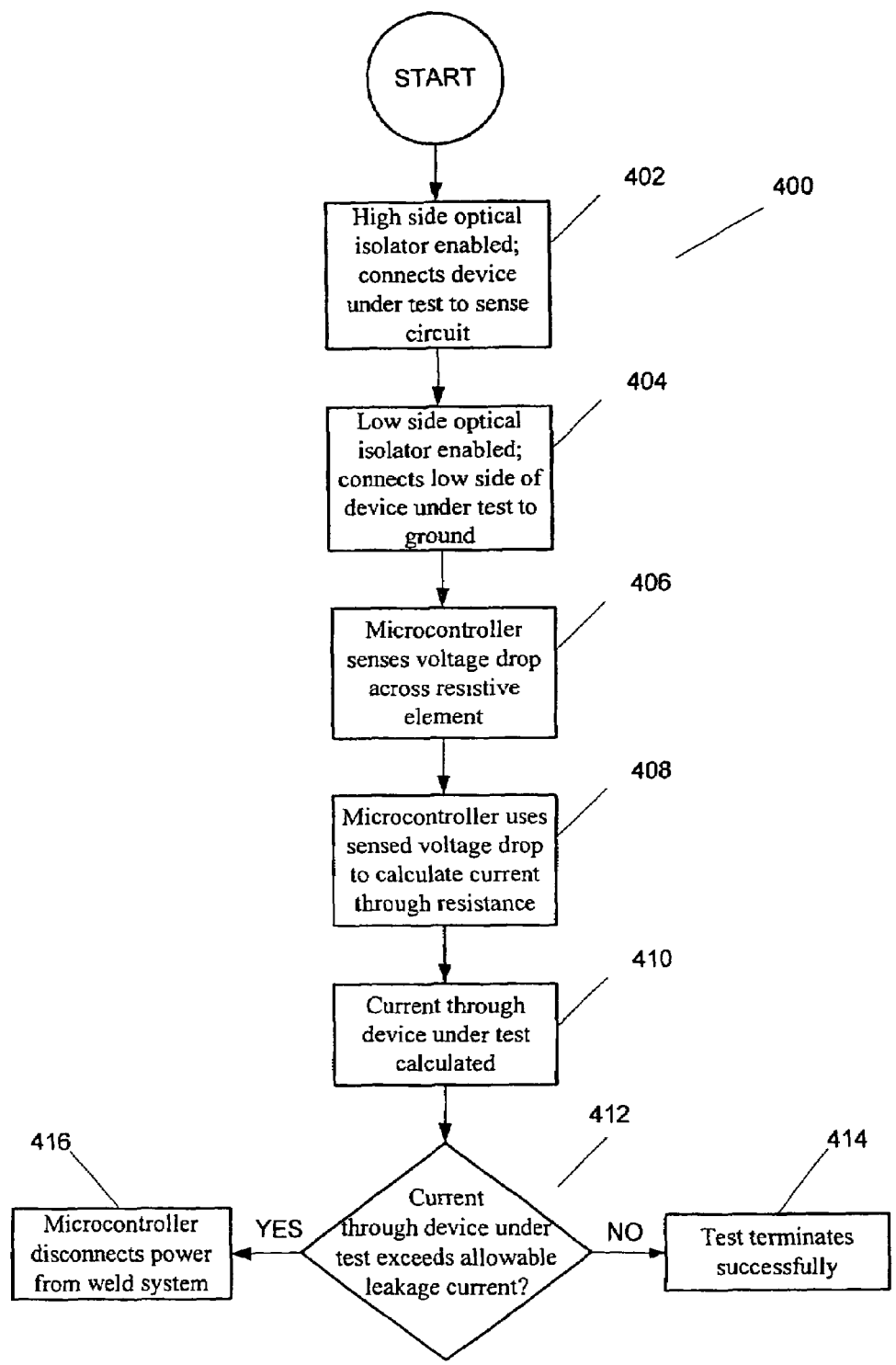
FIG. 4 is a flow chart showing a process of testing elements of the weld system according to an embodiment of the invention.

The more generalized operation of the safety circuit is illustrated via the flow chart 400 of FIG. 4. The environment of the test program described is a weld system comprising at least one device under test (e.g., a weld switch), a test circuit as described above, and a power source, as well as a breaker(s) to disconnect the power source from the system. The direction of flow of current through the device under test is from a high side to a low side. At step 402, the high side optical isolator is enabled, connecting the device under test to the sense circuit comprising the resistive element, A/D converters, and the microcontroller. At step 404, the low side optical isolator is enabled, connecting the low side of the device under test to ground.

At step 406, the microcontroller senses the voltage drop across the resistive element, and in step 408, the microcontroller uses the sensed voltage drop across the device under test to calculate the current through the resistance. In step 410, the current through the device under test is calculated as equal to the current through the resistance. In step 412, the current through the device under test is compared to an allowable leakage current. If the current through the device under test is less than or equal to the allowable leakage current, then in step 414 the test terminates successfully. If instead the current through the device under test is greater than the allowable leakage current, then in step 414 the microcontroller activates a trip coil or other device to open the breakers and disconnect power from the weld system.

Note that step 410 is included for the sake of understanding but that it may be omitted since the current through the device under test is the same as the current through the resistance. In addition, note that the enabling of the various optical isolators is within the control of the microcontroller in an embodiment of the invention. Thus, the microcontroller can be programmed to execute testing of various devices according to a schedule, on start up, on shut down, etc.

Figure 3:
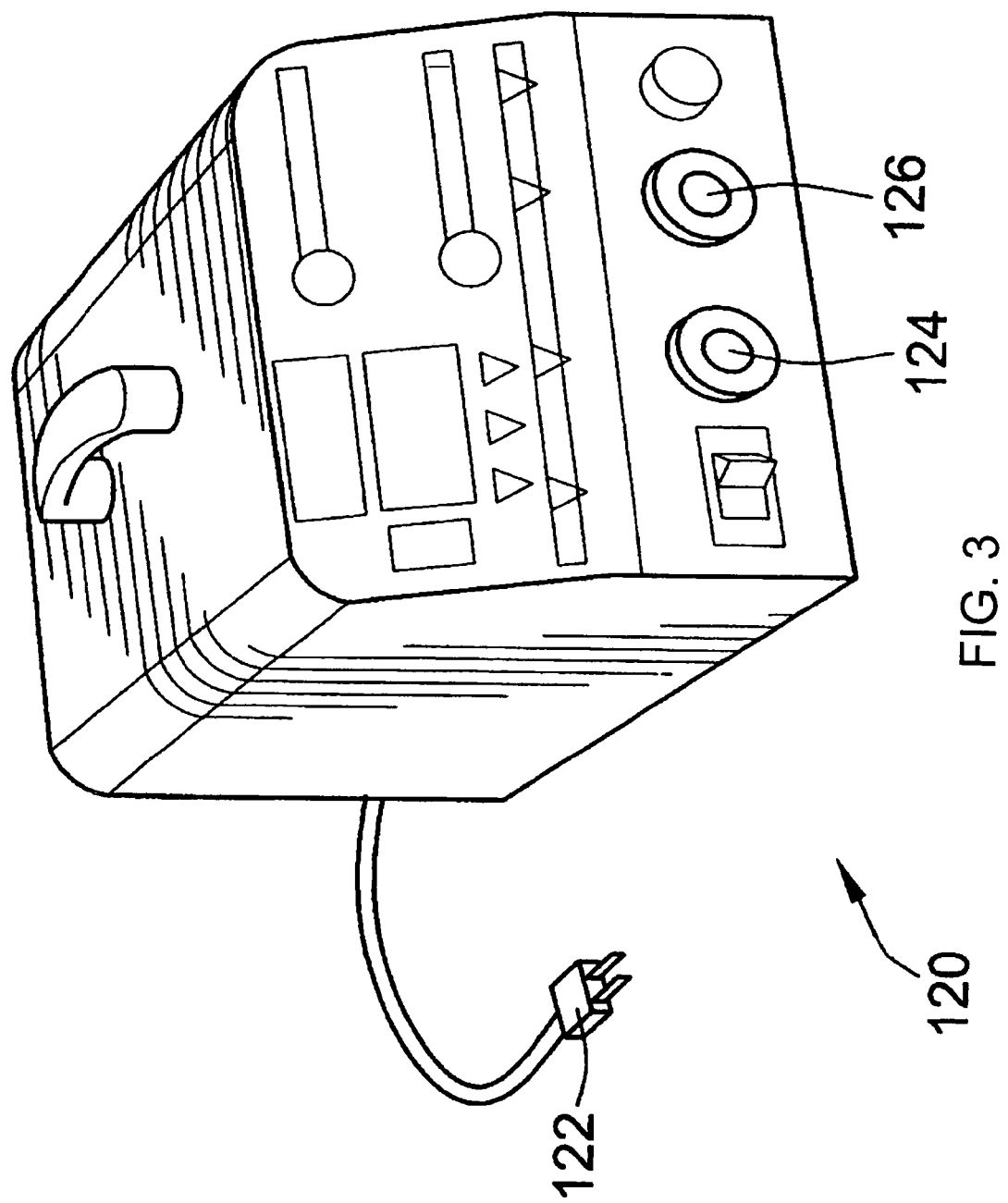
FIG. 3 is a perspective view of a welder for use with the weld circuit of FIG. 1 and the weld system of FIG. 2.

As shown in FIG. 3, the weld circuit 10, the safety circuit 96, and the weld system 94 can be employed in a general purpose capacitor discharge stud welding power supply (i.e., welder 120). Welder 120 is designed to weld pins and threaded fasteners to carbon steel, stainless steel, aluminum, and brass. The welder 120 is, in functional terms, an energy storage device that permits rapid discharge of the stored energy or charge. Capacitive discharge welders, such as welder 120, are well known in the art. Here, the welder 120 includes, among other things, a plug 122, a positive couple 124, and a negative couple 126. The plug 122 can, for example, be connected to the source 30 (as seen in FIGS. 1-2) on one end and associated with the positive and negative lines 32, 34. Also, the positive and negative couples 124, 126 can, for example, connect to the positive and negative weld terminals 90, 92 (as also seen in FIGS. 1-2). Thus, the welder 120 can include therein the weld circuit 10, the safety circuit 96, and/or the weld system 94.

Although the illustrations herein show and describe a two-phase system, it will be appreciated that the principles of the invention apply as well to a three-phase system. Having read this disclosure, those of skill in the art will appreciate that the addition of a third side to match the disclosed sides 36, 38 will enable adaptation of the system to three-phase power.

From the foregoing, it can be seen that a safety-enhancing weld circuit, employable in a commercially available welder, functions to isolate particular sections of the weld circuit from other sections in the welder. The weld circuit and welder also operate to isolate the user from the weld capacitors and the source and therefore protect the user from electrocution and/or a hazardous shock should a malfunction, short, and/or other problem occur.

All references, including publications, patent applications, and patents, cited herein are hereby incorporated by reference to the same extent as if each reference were individually and specifically indicated to be incorporated by reference and were set forth in its entirety herein.

The use of the terms "a" and "and" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A transformerless weld circuit for use in a welder, the weld circuit comprising:
    a transformerless charge section including a first plurality of solid state switches, the charge section having a charge section input and a charge section output, the charge section input coupleable to a power source, whereby the first plurality of solid state switches perform an electrical transformation function in lieu of a transformer and provide a full wave rectification at the charge section output of a signal supplied at the charge section input;
    a capacitor section including a weld capacitor, the capacitor section having a capacitor section input and a capacitor section output, wherein the capacitor section input is coupled to the charge section output; and
    a weld section including a second plurality of solid state switches, the weld section having a weld section input and a weld section output, the weld section input being coupled to the capacitor section output and the weld section output being coupled to a plurality of weld terminals, wherein the second plurality of solid state switches operates to selectively couple the plurality of weld terminals to the capacitor section output.

2. The weld circuit according to claim 1, wherein at least a portion of the solid state switches comprise silicon controlled rectifiers (SCRs).

3. The weld circuit of claim 1, wherein the first plurality of solid state switches and the second plurality of solid state switches isolate the charge section, the capacitor section, and the weld section from each other.

4. The weld circuit of claim 1, wherein the source is selectively coupleable to the weld capacitor by the first plurality of solid state switches.

5. The weld circuit of claim 1, wherein each of the second plurality of solid state switches is disabled when the welder is being charged.

6. The weld circuit of claim 1, wherein each of the first plurality of solid state switches is disabled when the welder has been charged and is in a charged state.

7. The weld circuit of claim 1, wherein each of the first plurality of solid state switches is disabled when the welder is welding.

8. The weld circuit of claim 1, wherein each of the second plurality of solid state switches is enabled and each of the first plurality of solid state switches is disabled when the welder is welding.

9. The weld circuit of claim 1, wherein the first plurality of solid state switches are arranged as a full wave rectifier across the source.

10. The weld circuit of claim 1, wherein the second plurality of solid state switches comprises a first weld silicon controlled rectifier (SCR) having a first weld SCR anode and a first weld SCR cathode, and a second weld SCR having a second weld SCR anode and a second weld SCR cathode.

11. The weld circuit of claim 10, wherein the weld terminals comprise a first and second weld terminals, the first weld SCR cathode coupleable to the first weld terminal and the second weld SCR anode coupleable to the second weld terminal.

12. The weld circuit of claim 10, wherein the first weld SCR anode and the second weld SCR cathode are disposed proximate the weld section input and the first weld SCR cathode and the second weld SCR anode are disposed proximate the weld section output.

13. The weld circuit of claim 1, wherein the power source is a two-phase source.

14. The weld circuit of claim 1, wherein the power source is a three-phase source.

15. A transformerless weld circuit for use in a welder, the weld circuit comprising:
    a transformerless charge section including first, second, third, and fourth charge silicon controlled rectifiers (charge SCRs), to receive AC power from a power source and to selectively provide a rectified output when one or more enabling signals are provided to the charge section;
    a capacitor section including a weld capacitor, the capacitor section having a capacitor section input and a capacitor section output, the capacitor section input being coupleable to the charge section output;
    a plurality of weld terminals; and
    a weld section including a plurality of weld silicon controlled rectifiers (weld SCRs) arranged to selectively couple the charge section output to the plurality of weld terminals when one or more enabling signals are provided to the weld section.

16. The weld circuit of claim 15, wherein the power source is a two-phase source.

17. The weld circuit of claim 15, wherein the power source is a three-phase source.

18. A weld system for a welder, the weld system comprising:
    a weld circuit including:
    a charge section including a first plurality of silicon controlled rectifiers (SCRs), the charge section having a charge section input and a charge section output, the charge section input coupleable to a source;
    a capacitor section including a weld capacitor, the capacitor section having a capacitor section input and a capacitor section output, the capacitor section input coupleable to the charge section output; and
    a weld section including a second plurality of silicon controlled rectifiers, the weld section having a weld section input and a weld section output, the weld section input coupleable to the capacitor section output and the weld section output coupleable to weld terminals; and
    a safety circuit including:
    a resistive element coupleable to a direct current source at a first node;
    a first optical isolator having a first isolator input and a first isolator output, the first isolator input coupleable to the resistive element at a second node, the first isolator output coupleable to a silicon controlled rectifier input (SCR input) on a selected one of the second plurality of SCRs;
    a second optical isolator having a second isolator input and a second isolator output, the second isolator input coupleable to a silicon controlled rectifier output (SCR output) on the selected one of the second plurality of SCRs, the second isolator output coupleable to a ground reference; and
    a microcontroller coupleable to the resistive element, the microcontroller monitoring a current through the resistive element when the first optical isolator and the second isolator are enabled.

19. The weld system according to claim 18, wherein the microcontroller is attached to the resistive element via one or more A/D converters.

20. A weld circuit for use in a welder, the weld circuit comprising:
    a charge section including first, second, third, and fourth charge silicon controlled rectifiers (charge SCRs), to receive AC power from a power source and to selectively provide a rectified output when one or more enabling signals are provided to the charge section;
    a capacitor section including a weld capacitor, the capacitor section having a capacitor section input and a capacitor section output, the capacitor section input being coupleable to the charge section output;
    a plurality of weld terminals;
    a weld section including a plurality of weld silicon controlled rectifiers (weld SCRs) arranged to selectively couple the charge section output to the plurality of weld terminals when one or more enabling signals are provided to the weld section; and
    a safety circuit for checling the operation of one or more components of the weld circuit and for disconnecting the weld circuit from the power source if a defect is found in a component of the weld circuit.

* * * * *